(12) United States Patent
Kaminski et al.

(10) Patent No.: US 7,764,663 B2
(45) Date of Patent: Jul. 27, 2010

(54) METHOD FOR MINIMIZING INTERFERENCE IN A CELLULAR OFDM COMMUNICATIONS SYSTEM

(75) Inventors: Stephen Kaminski, Eislingen (DE); Hajo Bakker, Eberdingen (DE); Rupert Rheinschmitt, Korntal (DE)

(73) Assignee: Alcatel Lucent, Paris (FR)

( * ) Notice: Subject to any disclaimer, the term of this patent is extended or adjusted under 35 U.S.C. 154(b) by 591 days.

(21) Appl. No.: 11/623,701

(22) Filed: Jan. 16, 2007

(65) Prior Publication Data

US 2007/0165569 A1    Jul. 19, 2007

(30) Foreign Application Priority Data

Jan. 17, 2006   (EP)   ................................. 06290101

(51) Int. Cl.
*H04B 7/208* (2006.01)
(52) U.S. Cl. ...................... 370/344; 370/330; 455/63.3; 455/67.11
(58) Field of Classification Search .................. 370/319, 370/328, 329, 330, 343, 344; 455/63.1, 501, 455/67.11, 450, 452.2
See application file for complete search history.

(56) References Cited

U.S. PATENT DOCUMENTS 5,726,978 A * 3/1998 Frodigh et al. .............. 370/252

| | | | |
|---|---|---|---|
| 2003/0021245 A1 | 1/2003 | Haumonte et al. | |
| 2005/0047259 A1* | 3/2005 | Ahn et al. | 365/232 |
| 2006/0018250 A1* | 1/2006 | Gu et al. | 370/208 |
| 2006/0083210 A1* | 4/2006 | Li et al. | 370/343 |
| 2006/0094372 A1* | 5/2006 | Ahn et al. | 455/67.13 |
| 2007/0081449 A1* | 4/2007 | Khan | 370/208 |

FOREIGN PATENT DOCUMENTS

| | | |
|---|---|---|
| EP | 1 526 674 A1 | 4/2005 |
| EP | 1 596 524 A1 | 11/2005 |

\* cited by examiner

*Primary Examiner*—Rafael Pérez-Gutiérrez
*Assistant Examiner*—Neda Behrooz
(74) *Attorney, Agent, or Firm*—Fay Sharpe LLP

(57) ABSTRACT

The invention concerns a method for minimizing the interference in a cellular OFDM communication network, wherein mobile stations are divided into groups according to the radio channel quality, the interference levels of mobile stations which belong to a first group of mobile stations with a radio channel quality which is lower than that of at least one other group are combined into a common interference level, the sub-carriers of the OFDM communication network are divided into quantities according to the common interference level of the first group of mobile stations and sub-carriers which belong to a first quantity with a common interference level which is lower than that of at least one other group are selected as preferred subcarriers for transmission to the mobile stations that belong to the first group.

15 Claims, 4 Drawing Sheets

METHOD FOR MINIMIZING INTERFERENCE IN A CELLULAR OFDM COMMUNICATIONS SYSTEM

BACKGROUND OF THE INVENTION

The invention is based on a priority application EP06290101.2 which is hereby incorporated by reference.

The invention concerns a method for minimising the interference in a communications system according to the preamble of claim 1, a base station according to the preamble of claim 8 and a mobile station according to the preamble of claim 9.

OFDM air interfaces (OFDM=Orthogonal Frequency Division Multiplexing) are becoming increasingly important e.g. for the future development of air interfaces in 3GPP radio access networks (3GPP=Third Generation Partnership Project), for wireless local networks such as Wireless Local Area Networks (WLANs) according to standard IEEE 802.11a or for air interfaces of the fourth generation.

The capacity of a cellular OFDM system can be increased by the use of frequency selective algorithms for resource division, such as e.g. adaptive modulation, sub-carrier distribution or power control. In order to increase the capacity in areas in which high interference is expected, to reduce interference the interference coordination principle can be applied. This means that certain sub-carriers which belong to the same frequency pattern are used only with reduced transmission power in a cell. This reduction in transmission power admittedly leads to a deterioration in capacity in the region of the cell but in adjacent cells the interference for these particular sub-carriers is reduced, which increases the capacity there. The extent of the deterioration depends on the condition of the radio channels of the interfering base stations and on the frequency pattern that is used with the reduced power. This interference coordination principle requires coordination between the base stations involved. Other concepts for interference reduction are based e.g. on the principle of frequency hopping or special coding methods such as e.g. the so-called Costas sequences.

Conventional methods for interference reduction for OFDM interfaces are accompanied by a reduction in capacity above all in the peripheral regions of the cell. Costas sequences are furthermore only able to minimise the influence of interference, but do not allow adaptation or optimisation of the momentary use of the frequency resources.

SUMMARY OF THE INVENTION

The invention is based on the object of finding a remedy for the situation described above and minimising the interference between interfering base stations in order to obtain an optimum capacity of all mobile stations as a function of their location, simultaneously minimising the interaction between base stations.

This object is achieved according to the invention by a method for minimising interference in a cellular OFDM communication system according to the teaching of claim 1, a base station according to the teaching of claim 8 and a mobile station according to the teaching of claim 9.

The fundamental idea of the invention is based on the fact that both the variation of radio channel and the interference level contribute to noise in the associated mobile station. When the base station knows the quality of the radio channel depending on the individual sub-carriers and the noise in the individual mobile stations, the base station can deduce on which sub-carriers transmission is probably best. On this basis general optimisation can be performed with the objective of reducing the influence of inter- and intra-cell interference. With the method according to the invention that is based on the principle of self-adaptation, adaptation is performed to dynamically changing interference situations which e.g. vary with the capacity utilization, the distribution of mobile stations or the radio channel conditions.

The interference can be reduced to a minimum if knowledge about the interfering base stations and the quality of the radio channel is available in the transmitting base stations. This information is contained in several possible measurements e.g. of the signal-noise or signal-interference ratio, the channel transfer function or the strength of the interfering signals.

When the mobile stations transmit such information on interfering signal strength, radio channel quality and radio channel characteristics to the base station, the base station can estimate and predict, for all mobile stations, the situation in relation to interference and radio channel quality for the case that a particular signal is transmitted with a particular power to a mobile station.

Also a structure can be applied which ensures that the entire band is not fully occupied by a single transmitter. For this it can be implemented that a base station always reduces the maximum transmission power for a particular part of the sub-carriers and as a result generates a gap in the spectrum of sub-carriers which can be used by other base stations to reach the mobile stations allocated to them on these sub-carriers. This structure is particularly suitable for OFDM-based systems as the sub-carriers can be selected individually for each transmission. Additional measures to prevent oscillations caused by frequent changes of the gaps in the spectrum of the sub-carriers can easily be implemented.

Further embodiments of the invention are given in the sub-claims and in the description below.

BRIEF DESCRIPTION OF THE DRAWINGS

The invention is explained in more detail below with reference to the enclosed drawings.

Figure 1:
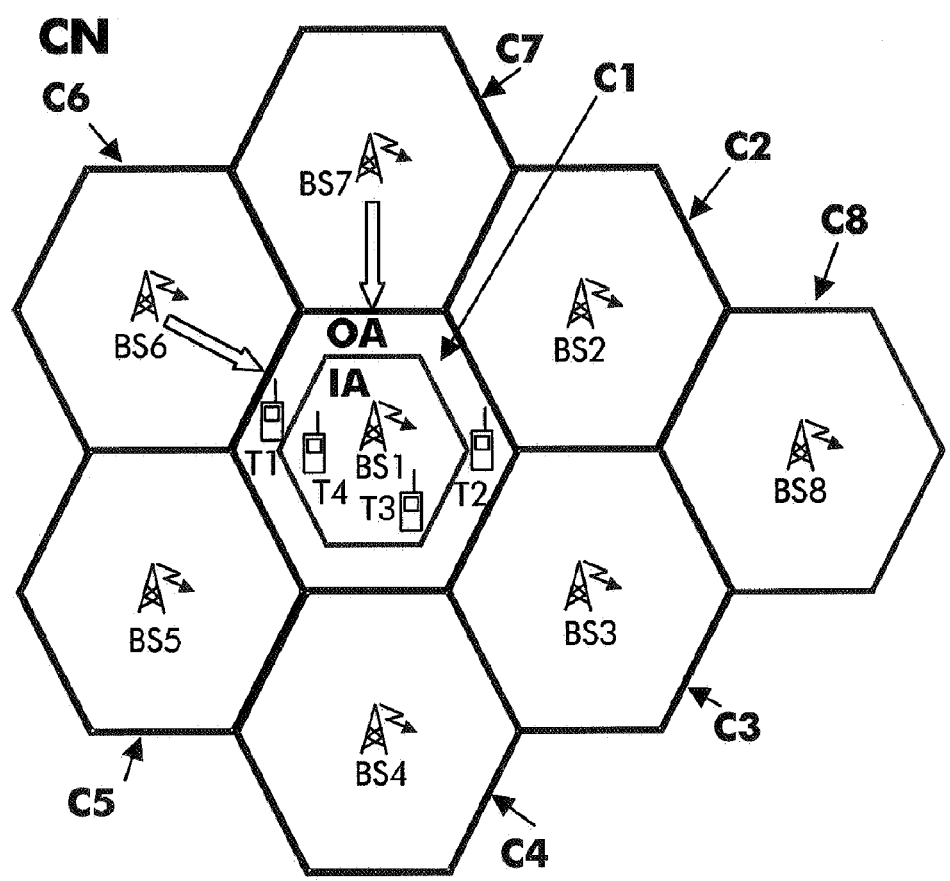
FIG. 1 shows an example of a cellular communication network in which the invention can be implemented.

The cellular communication network CN shown in FIG. 1 is divided as an example into eight cells C1-C8 and contains as an example eight base stations BS1 and BS8 and four mobile stations T1-T4.

Each of the 8 base stations BS1-BS8 supplies its allocated cells C1-C8 and thus enables mobile stations in the allocated cell C1-C8 to exchange data.

For reasons of clarity, the connections of the base stations BS1-BS8 to further elements in the communications network, e.g. control units, are not shown in FIG. 1.

Cell C1 is divided as an example into an area OA which contains the mobile stations T1, T2 with poorer quality radio channels and an area IA with mobile stations T3, T4 with better quality radio channels. Area OA is usually identical with the outer area of the cells and area IA identical with the inner area of the cells.

The radio connection between the mobile stations T1-T4 and the base station BS1 is disrupted by the interference from adjacent base stations BS2-BS8. It is indicated as an example for cells C6, C7 by broad arrows.

The base stations BS1-BS8 contain the functionality of base stations in a cellular communication network i.e. they offer mobile stations T1-T4 the possibility of being connected to the communication network CN.

Also the base stations BS1-BS8 according to the invention have means for dividing mobile stations T1-T4 into groups according to radio channel quality in order to combine the interference level of mobile stations T1, T2 which belong to a first group of mobile stations T1, T2 with a radio channel quality that is lower than that of at least one other group, into a common interference level in order to divide the sub-carriers of the OFDM communication network CN into quantities according to the common interference level of the first group of mobile stations T1, T2, and in order to select sub-carriers which belong to a first quantity with a common interference level which is lower than that of at least one other quantity as preferred sub-carriers for the transmission to the mobile stations T1, T2 which belong to the first group.

Mobile stations T1-T4 contain the functionality of mobile stations in a cellular communication network i.e. the mobile stations T1, T4 can be connected by means of a base station BS1 with the communication network CN.

Also the mobile stations T1-T4 according to the invention have means for measuring the quality of the radio channels and the interference level and transmitting this to the base station BS1 of their allocated cell C1.

Figure 2:
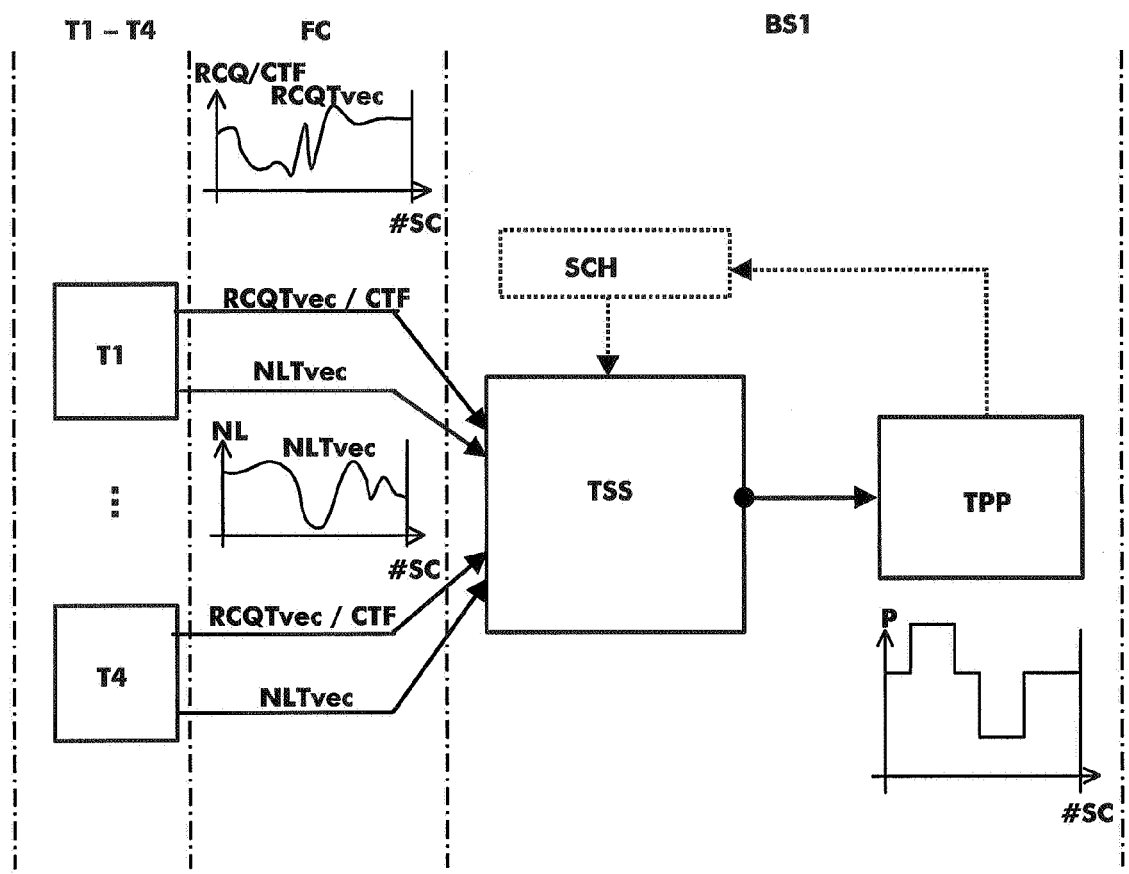
FIG. 2 shows as an example the performance of the method according to the invention by the transmission of information on interference level and radio channel quality from the mobile stations to the base station.

FIG. 2 shows as an example the performance of the method according to the invention. The method is divided schematically for reasons of clarity into three process steps which are delineated by vertical dotted lines. The first process step extends to mobile stations T1-T4. Each mobile station T1-T4 measures the quality of the radio channels RCQTvec and the interference NLTvec as a function of the individual sub-carriers SC.

Then in the second process step in which feedback channels FC are used, symbolised by arrows, the mobile stations T1-T4 transmit the quality of the radio channels RCQTvec e.g. in the form of a Channel Transfer Function CTF over the feedback channels FC to the base station BS1 to which the third process step relates.

Similarly to the transmission of quality of the radio channels RCQTvec, the interference level NLTvec is transmitted over the feedback channels FC from the mobile stations T1-T4 to the base station BS1.

Two diagrams show as an example the quality of the radio channels RCQTvec as expressed e.g. by the Channel Transfer Function CTF and the interference level NLTvec over the sub-carriers SC.

The quality of the radio channels RCQTvec is usually transmitted with very short repeat rates e.g. in each or every second transmission time interval (TTI), in contrast to which the interference level NLTvec is transmitted more rarely e.g. in every hundredth transmission time interval.

In the third process step which extends to the base station BS1, in the base station BS1 in the module for selection of the transmission power and sub-carriers TSS, the information on the quality of the radio channels RCQTvec and the interference level NLTvec is analysed. On the basis of the analysis sub-carriers SC are allocated to mobile stations T1-T4 for use.

In a further embodiment on the basis of the analysis, a set of sub-carriers SC is selected in the module for the selection of transmission power and sub-carriers TSS, which set is used by the base station BS1 with modified transmission power P. This modification of the transmission power P, i.e. attenuation or amplification, can be made individually per sub-carrier SC. This profile of the transmission power is stored in the base station BS1 in a storage module TPP. The example curve of this profile is shown in the diagram below the storage module TPP. There the transmission power P is shown over the sub-carriers SC.

A more detailed description of the third process step is given below with reference to FIG. 3.

The mobile stations T1-T4 are sorted according to radio channel quality RCQTvec which was obtained e.g. by analysis of the channel transfer function CTF in the module for selection of transmission power and sub-carriers TSS, wherein the quality of the radio channels RCQTvec is preferably averaged for each mobile station T1-T4 so that there is a radio quality parameter RCQT for each mobile station T1-T4. Alternatively the quality of the radio channels RCQTvec can also be combined, weighted, into the radio quality parameter RCQT per mobile station T1-T4. The number of active and reporting mobile stations T1-T4 is divided into groups according to the radio quality parameter RCQT.

The size of the groups can be determined e.g. by a maximum number of mobile stations T1-T4 per group or a percentage of the total number of mobile stations T1-T4.

Figure 3:
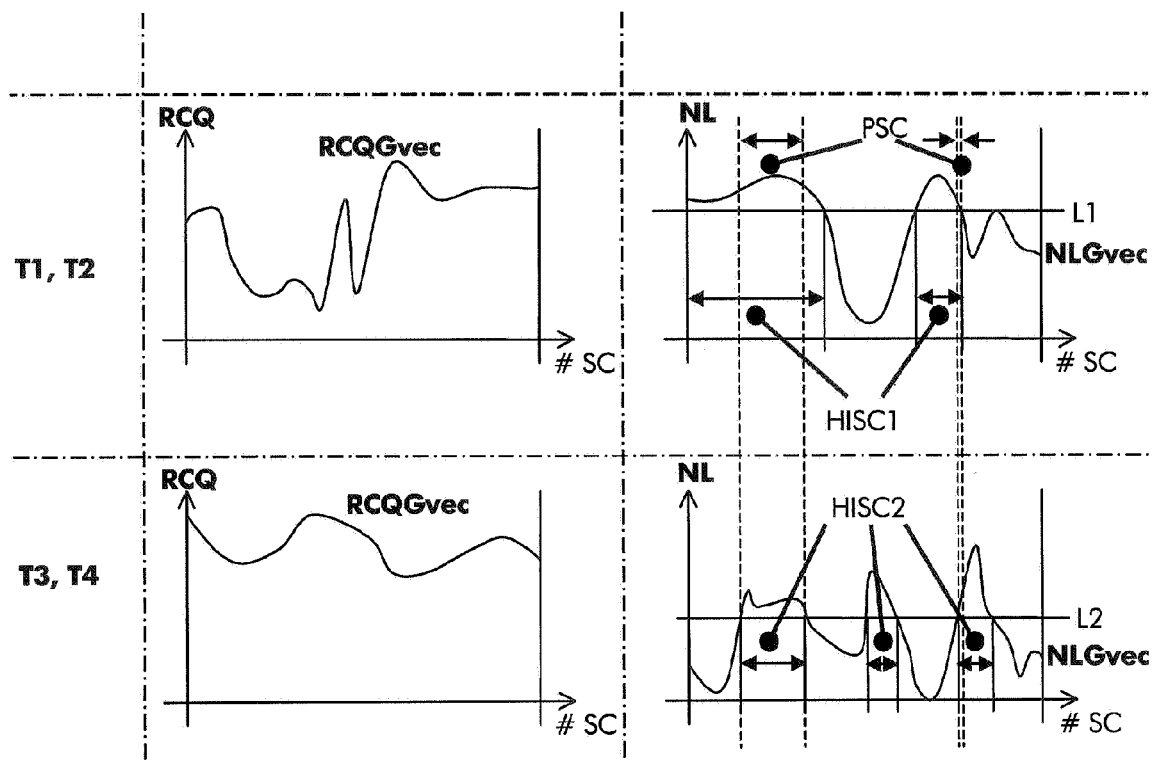
FIG. 3 shows as an example the principle of the method according to the invention for the selection of sub-carriers on which transmission is to take place with reduced power.

FIG. 3 shows the classification of mobile stations T1-T4 according to radio quality parameter RCQT. The upper row relates to a first group of mobile stations T1, T2 with a poor average radio channel quality, i.e. with low radio quality parameter RCQT, and the bottom row relates to a second group of mobile stations T3, T4 with a good average radio channel quality, i.e. with high radio quality parameter RCQT. For both groups, as an example in a diagram the curve of the common radio channel quality RCQGvec is shown over the sub-carriers SC for the respective group of mobile stations. The common quality of the radio channels RCQGvec for a group of mobile stations is achieved by weighted combination of the quality of the radio channels RCQTvec of the individual mobile stations of the group concerned. For the sake of clarity the example described in FIG. 3 is restricted to classification of mobile stations T1-T4 into two groups according to radio quality parameter RCQT. The principle of the invention can however be extended to any number of groups.

The information on the interference level NLTvec of the individual mobile stations T1-T4 is analysed however differently. First the intra-cell interference, that is caused by the base station BS1 itself and known to it, is deducted from the reported interference level NLTvec to give the pure inter-cell interference caused by the other base stations BS2-BS8. Then the levels of inter-cell interferences of the mobile stations T1, T2 of the first group with low radio quality parameter RCQT are combined into a common interference level NLGvec, wherein on combination the levels of the inter-cell interferences of the individual mobile stations T1, T2 can be weighted differently. Similarly the levels of the inter-cell interferences of mobile stations T3, T4 of the second group with high radio quality parameter RCQT are combined into a common interference level NLGvec, wherein here too on combination the levels of the inter-cell interferences of the individual mobile stations T1, T2 can be weighted differently. This interference level NLGvec is shown as an example in the diagrams in FIG. 3 for both groups over the sub-carriers SC.

If we now consider the analysis for mobile stations T1, T2 of the first group, those sub-carriers SC with a common interference level NLGvec below a certain threshold value L1 are selected by the base station BS1 as the preferred sub-carriers SC for transmission to mobile stations T1, T2. The reason for this selection is that mobile stations T1, T2 which are remote from base station BS1 usually have a low radio quality parameter RCQT. Such mobile stations T1, T2 should be served by the base station BS1 on sub-carriers which have a low common interference level NLGvec in order to achieve any communication.

Such sub-carriers SC with a common interference level NLGvec below the threshold value L1 are very probably used by other base stations BS1-BS8 with reduced transmission power. However other factors such as a high so-called path loss i.e. propagation losses in the adjacent cells C2-CB, or the fact that nothing is transmitted on these sub-carriers SC in the adjacent cells, contribute to the low common interference level NLGvec. The threshold value L1 and hence the number of sub-carriers SC with low common interference level NLGvec can be selected e.g. so as to give a defined number or defined percentage of sub-carriers SC with low common interference level NLGvec.

In an advantageous embodiment the base station BS1 determines a particular number of preferred sub-carriers for use with reduced transmission power P during a particular time interval. For this we consider the analysis of the common interference level NLGvec for mobile stations T1, T2 of the first group, and those sub-carriers HISC1 with a common interference level NLGvec above threshold L1 are selected as preferred sub-carriers for transmission with reduced transmission power P since these sub-carriers HISC1 with high common interference level NLGvec are probably used in adjacent cells C2-C8 and the reduced transmission power P within the cell C1 reduces the interference in the adjacent cells C2-C7.

In a further embodiment preferred sub-carriers for transmission with reduced transmission power P are selected using the mobile stations T3, T4 of the second group with high radio quality parameter RCQT. Only those sub-carriers which are preferably not used by the mobile stations T3, T4 of the second group are selected as preferred sub-carriers PSC for transmission with reduced transmission power P.

If in FIG. 3 we consider the analysis of the common interference level NLGvec for mobile stations T3, T4 of the second group, in the same way as in mobile stations T1, T2 of the first group those sub-carriers SC with a common interference level NLGvec below a particular threshold value L2 are selected by the base station BS1 as preferred sub-carriers for transmission to the mobile stations T3, T4. The sub-carriers HISC2 with a common interference level NLGvec above threshold value L2 however are not used preferably for transmission to the mobile stations T3, T4 of the second group. The threshold value L2 and hence the number of sub-carriers SC with low common interference level NLGvec can e.g. be selected to give a defined number or defined percentage of sub-carriers SC with low common interference level NLGvec.

The sub-carriers HISC1 with a common interference level NLGvec above the threshold value L1 are now compared with the sub-carriers HISC2 with a common interference level NLGvec above threshold value L2, and only those sub-carriers which are contained in both the quantity of sub-carriers HISC1 and the quantity of sub-carriers HISC2 are selected as preferred sub-carriers PSC for transmission with reduced transmission power P. In FIG. 3 the sub-carriers HISC1 and HISC2 are identified by double arrows and delimited by solid lines, and the preferred sub-carriers PSC for transmission with reduced transmission power P are also identified with double arrows but delimited by dotted lines.

In a further embodiment the sub-carriers HISC1 with a common interference level NLGvec above the threshold value L1 are compared with sub-carriers with a common interference level NLGvec below threshold value L2, and only those sub-carriers which are contained only in the quantity of sub-carriers HISC1 and not in the quantity of sub-carriers with a common interference level NLGvec below threshold value L2, are selected as preferred sub-carriers PSC for transmission with reduced transmission power P.

In a further embodiment preferred sub-carriers PSC are selected for transmission with reduced transmission power P at random from those sub-carriers which do not belong to the quantity of sub-carriers SC with a common interference level NLGvec below threshold value L1.

The base station BS1 selects, from the preferred sub-carriers PSC for transmission with reduced transmission power P, a number of sub-carriers which are used with reduced transmission power P.

In one embodiment the base station BS1 selects, from the preferred sub-carriers PSC, for use with reduced transmission power P, those sub-carriers which have the highest common interference level NLGvec.

In a further embodiment the base station BS1 selects from the preferred sub-carriers PSC, for use with reduced transmission power, those sub-carriers which have the poorest common quality of the radio channels RCQGvec.

In a further embodiment from the preferred sub-carriers PSC, a number of sub-carriers for transmission with reduced transmission power P are selected taking into account optimisation of data throughput. In this case the preferred sub-carriers PSC are studied with regard to the data throughput rate they can provide. The preferred sub-carriers PSC with the lowest data throughput rates to be expected are then used for transmission with reduced transmission power P.

Measurement of the interference level NLTvec is possible only on sub-carriers on which mobile stations T1-T4 receive useful data. In a further embodiment therefore to optimise the method according to the invention a control module SCH allocates the sub-carriers SC to the mobile stations T1-T4 so that mobile stations T1-T4 receive useful data at least once in the course of the measurement interval of interference level NLTvec. FIG. 3 shows that the control module SCH receives from storage module TPP the profile of the transmission power applied over the sub-carriers SC and sends control signals for allocation of sub-carriers SC to the mobile stations T1-T4 to the module for selection of transmission power and sub-carriers TSS.

Figure 4:
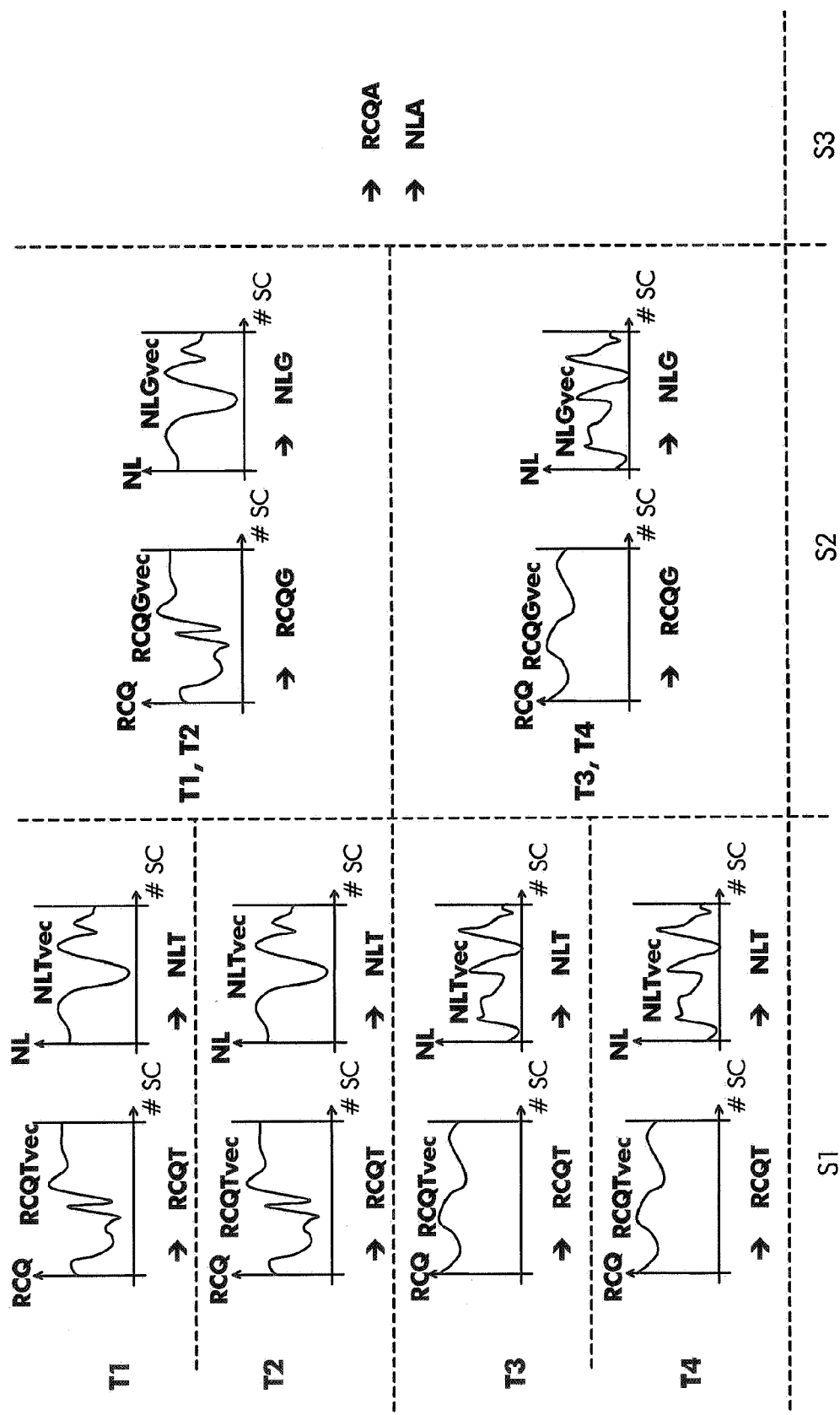
FIG. 4 shows diagrammatically the various levels of processing of information on interference level and radio channel quality.

In FIG. 4 for the sake of clarity the various levels of processing of information on interference and radio channel quality are given. In the first level S1 which relates to analysis per mobile station, at the level of the mobile stations T1-T4 the quality of the radio channels RCQTvec is measured per mobile station. FIG. 4 shows the radio channel quality RCQTvec for each mobile station T1-T4 over the sub-carriers SC.

For each mobile station T1-T4 the radio quality parameter RCQT is determined from the quality of the radio channels of the corresponding mobile stations T1-T4.

Similarly the interference level NLTvec is measured per mobile station and this value is shown per mobile station T1-T4 over the sub-carriers SC.

In a further embodiment for each mobile station T1-T4 the interference parameter NLT is determined from a weighted average of interference level NLTvec.

The mobile stations according to the radio quality parameter RCQT are divided into groups, as is evident in the second level from the division into one group with mobile stations T1 and T2 and one group with mobile stations T3 and T4.

In the second level S2 which relates to analysis within a group of mobile stations, for each group the common radio channel quality RCQGvec is determined from the weighted combination of radio channel quality RCQTvec of the individual mobile stations of the group concerned.

Similarly for each group the common interference level NLGvec is determined from the weighted combination of interference level NLTvec of the individual mobile stations of the group concerned.

The common quality of the radio channels RCQGvec and the common interference level NLGvec are shown in level S2 over the sub-carriers SC.

In a further embodiment for each group of mobile stations a group radio quality parameter RCQG is determined from the weighted combination of the common radio channel quality RCQGvec over all sub-carriers SC.

Similarly for each group of mobile stations a group interference parameter NLG is determined from the weighted combination of the common interference levels NLGvec over all sub-carriers SC.

In a further embodiment finally, as can be seen from level S3, for all mobile stations T1-T4 in all groups a global radio quality parameter RCQA is determined from the weighted combination of group radio quality parameters RCQG of all groups.

Similarly for all mobile stations T1-T4 in all groups a global interference parameter NLA is determined from the weighted combination of the group interference parameters NLG of all groups.

In a further embodiment the group interference parameter NLG or the global interference parameter NLA is used to establish the threshold value L1 or L2.

The invention claimed is:

1. A method for minimizing interference in a cellular OFDM communication network, wherein
    mobile stations allocated to a cell measure radio channel quality and interference level as a function of individual sub-carriers and transmit these to a base station of the cell,
    the radio channel quality is combined into a radio quality parameter for each mobile station,
    the mobile stations are divided into groups according to the radio quality parameter,
    the interference level of mobile stations which belong to a first group of mobile stations, with a radio quality parameter that is lower than that of at least one other group, are combined into a common interference level,
    the sub-carriers of the OFDM communication network are divided into quantities according to the common interference level of the first group of mobile stations,
    and sub-carriers which belong to a first quantity, with a common interference level which is lower than that of at least one other quantity, are selected as preferred sub-carriers for transmission to the mobile stations which belong to the first group.

2. The method according to claim 1, wherein sub-carriers which belong to a second quantity, with a common interference level which is higher than the common interference level of sub-carriers of the first quantity, are selected as preferred sub-carriers for use with reduced transmission power.

3. The method according to claim 2, wherein from the preferred sub-carriers are selected for use with reduced transmission power those sub-carriers which have the highest common interference level.

4. The method according to claim 2, wherein from the preferred sub-carriers are selected for use with reduced transmission power those sub-carriers which have the poorest common radio channel quality.

5. The method according to claim 1, wherein
    the interference level of mobile stations which belong to a second group of mobile stations, with a radio quality parameter that is higher than that of the first group, are combined into a common interference level of the second group of mobile stations,
    the sub-carriers of the OFDM communication network are divided into quantities according to the common interference level of the second group of mobile stations,
    sub-carriers which belong to a quantity, with a common interference level of the second group of mobile stations which is lower than the common interference level of at least one other quantity, are compared with sub-carriers which belong to a quantity with a common interference level of the first group of mobile stations that is higher than the common interference level of sub-carriers of at least one other quantity,
    and selected as preferred sub-carriers for use with reduced transmission power are those sub-carriers which belong only to the quantity with a common interference level of the first group of mobile stations that is higher than the common interference level of sub-carriers of at least one other quantity.

6. The method according to claim 1, wherein
    the interference level of mobile stations which belong to a second group of mobile stations with a radio quality parameter that is higher than that of the first group are combined into a common interference level of the second group of mobile stations,
    the sub-carriers of the OFDM communication network are divided into quantities according to the common interference level of the second group of mobile stations,
    sub-carriers which belong to a quantity with a common interference level of the second group of mobile stations which is higher than the common interference level of at least one other quantity, are compared with sub-carriers which belong to a quantity with a common interference level of the first group of mobile stations that is higher than the common interference level of sub-carriers of at least one other quantity,
    and selected as preferred sub-carriers for use with reduced transmission power are those sub-carriers which belong to both quantities.

7. The method according to claim 1, wherein sub-carriers for use with reduced transmission power are selected at random from sub-carriers which do not belong to a quantity.

8. A base station in a cellular OFDM communication network, said base station comprising:
    means for combining radio channel quality into a radio quality parameter for each of a plurality of mobile stations;
    means for dividing the plurality of mobile stations into groups according to the radio quality parameter;
    means for combining interference level of mobile stations which belong to a first group of mobile stations, with a radio quality parameter that is lower than that of at least one other group, into a common interference level;

means for dividing sub-carriers of the OFDM communication network into quantities according to the common interference level of the first group of mobile stations; and, means for selecting sub-carriers which belong to a first quantity, with a common interference level which is lower than that of at least one other quantity, as preferred sub-carriers for the transmission to the mobile stations which belong to the first group.

9. A method for minimizing interference in a cellular OFDM communication network, wherein said cellular OFDM communication network comprises a plurality of sub-carriers and a plurality of cells, wherein each of said plurality of cells comprises a base station, wherein at least one of said plurality of cells includes one or more mobile stations, said method comprising the steps of:

measuring radio channel quality and interference level as a function of each of the plurality of sub-carriers, wherein each of the one or more mobile stations measures said radio channel quality and said interference level as a function of each of the plurality of sub-carriers and transmits said measurements to the base station of the cell corresponding to the each of said one or more mobile stations;

combining said radio channel quality into a radio quality parameter for the each of the one or more mobile stations;

dividing the one or more mobile stations into groups according to the radio quality parameter of the each of the one or more mobile stations, wherein said groups include a first group and at least one other group, wherein the radio quality parameters of the mobile stations of the first group are lower than that the radio quality parameters of the mobile stations of at least one of the at least one other group;

combining said interference levels of the mobile stations of the first group into a common interference level;

dividing the plurality of sub-carriers into first quantities according to the common interference level of the first group, wherein said first quantities include a first quantity and at least one other quantity, wherein a common interference level of the first quantity is lower than a common interference level of at least one of the at least one other quantity; and, selecting sub-carriers which belong to the first quantity as preferred sub-carriers for transmission to the mobile stations of the first group.

10. The method of claim 9, wherein said at least one other quantity includes a second quantity, wherein the common interference level of the second quantity is higher than the common interference level of the first quantity, said method further comprising selecting sub-carriers which belong to the second quantity, wherein said selected sub-carriers are preferred sub-carriers for use with reduced transmission power.

11. The method of claim 10, further comprising selecting sub-carriers with highest common interference levels from the preferred sub-carriers, wherein said selected sub-carriers are for use with reduced transmission power.

12. The method of claim 10, further comprising selecting sub-carriers with poorest common radio channel quality from the preferred sub-carriers, wherein said selected sub-carriers are for use with reduced transmission power.

13. The method of claim 9, wherein said at least one other group includes a second group, wherein the radio quality parameters of the mobile stations of the second group are higher than the radio quality parameters of the mobile stations of the first group, wherein said first quantities includes a quantity, wherein a common interference level of the quantity of said first quantities is higher than a common interference level corresponding to at least one other quantity of said first quantities, said method further comprising:

combining said interference levels of the mobile stations of the second group into a common interference level;

dividing the plurality of sub-carriers into second quantities according to the common interference level of the second group, wherein said second quantities includes a quantity and at least one other quantity, wherein a common interference level of said quantity of said second quantities is lower than a common interference level of at least one of the at least one other quantity;

comparing sub-carriers corresponding to the quantity of the second quantities with sub-carriers corresponding to the quantity of the first quantities; and, selecting sub-carriers which belong to the quantity of the first quantities and not the quantity of the second quantities, wherein said selected sub-carriers are preferred sub-carriers for use with reduced transmission power.

14. The method of claim 9, wherein said at least one other group includes a second group, wherein the radio quality parameters of the mobile stations of the second group are higher than the radio quality parameters of the mobile stations of the first group, wherein said first quantities includes a quantity, wherein a common interference level of the quantity of said first quantities is higher than a common interference level corresponding to at least one other quantity of said first quantities, said method further comprising:

combining said interference levels of the mobile stations of the second group into a common interference level;

dividing the plurality of sub-carriers into second quantities according to the common interference level of the second group, wherein said second quantities includes a quantity and at least one other quantity, wherein a common interference level of the quantity of said second quantities is higher than a common interference level of at least one of the at least one other quantity;

comparing sub-carriers corresponding to the quantity of the second quantities with sub-carriers corresponding to the quantity of the first quantities; and, selecting sub-carriers which belong to both the quantity of the first quantities and the quantity of the second quantities, wherein said selected sub-carriers are preferred sub-carriers for use with reduced transmission.

15. The method of claim 9, further comprising selecting sub-carriers at random from sub-carriers which do not belong to a quantity, wherein said selected sub-carriers are preferred sub-carriers for use with reduced transmission power.

* * * * *